United States Patent
Payne et al.

(10) Patent No.: US 11,635,053 B2
(45) Date of Patent: Apr. 25, 2023

(54) STARTER-GENERATOR WITH POWER ELECTRONIC UNIT

(71) Applicant: Schaeffler Technologies AG & Co. KG, Herzogenaurach (DE)

(72) Inventors: Matthew Payne, Glenmont, OH (US); Markus Steinberger, Sagamore Hills, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 239 days.

(21) Appl. No.: 16/952,480

(22) Filed: Nov. 19, 2020

(65) Prior Publication Data

US 2022/0154675 A1    May 19, 2022

(51) Int. Cl.

| | |
|---|---|
| H02K 5/22 | (2006.01) |
| H02K 7/00 | (2006.01) |
| H02K 24/00 | (2006.01) |
| H02K 11/225 | (2016.01) |
| H02K 11/33 | (2016.01) |
| H02K 7/075 | (2006.01) |
| F02N 11/04 | (2006.01) |

(52) U.S. Cl.
CPC .............. *F02N 11/04* (2013.01); *H02K 5/225* (2013.01); *H02K 7/006* (2013.01); *H02K 7/075* (2013.01); *H02K 11/225* (2016.01); *H02K 11/33* (2016.01); *H02K 24/00* (2013.01)

(58) Field of Classification Search
CPC ....... F02N 11/04; F02N 15/006; H02K 5/225; H02K 7/006; H02K 7/075; H02K 11/225; H02K 11/33; H02K 24/00; H02K 7/085; H02K 7/1815; H02K 2213/03
See application file for complete search history.

(56) References Cited

U.S. PATENT DOCUMENTS

| | | | | |
|---|---|---|---|---|
| 6,133,659 A | * | 10/2000 | Rao | B60L 15/20 123/3 |
| 6,571,895 B2 | * | 6/2003 | Weimer | H02K 7/006 322/1 |
| 7,051,823 B2 | * | 5/2006 | Bosch | F02B 67/00 180/65.1 |
| 7,560,838 B2 | * | 7/2009 | van der Woude | F02C 7/32 310/64 |

(Continued)

FOREIGN PATENT DOCUMENTS

DE    102021127634 A1 *   5/2022   ............. F02N 11/04

*Primary Examiner* — Pedro J Cuevas

(57) ABSTRACT

A starter-generator module for a vehicle includes a bulkhead wall, a module housing fixed to the bulkhead wall, an e-motor stator fixed to the module housing, an e-motor rotor disposed radially inside of the e-motor stator, and a power electronics unit fixed to the module housing. The module housing has a first opening and the power electronics unit covers the first opening. The e-motor rotor has a rotor carrier arranged for fixing to a crankshaft of the internal combustion engine. In an example embodiment, the rotor carrier includes holes arranged for receiving respective fasteners for fixing the rotor carrier to an engine crankshaft, and a bolt circle diameter of the holes is less than an inside diameter of the first opening. In an example embodiment, the rotor carrier is fixed to a crankshaft by a bolt, and the first opening is arranged for receiving a tool to secure the bolt.

20 Claims, 2 Drawing Sheets

(56) References Cited

U.S. PATENT DOCUMENTS

| | | | | |
|---|---|---|---|---|
| 8,227,931 | B2* | 7/2012 | Aschaber | H02K 7/003 |
| | | | | 290/52 |
| 8,820,286 | B2* | 9/2014 | Cole | H02K 11/048 |
| | | | | 123/179.3 |
| 10,538,156 | B2* | 1/2020 | Son | F16F 15/30 |
| 10,556,496 | B2* | 2/2020 | Son | B60K 6/485 |
| 10,677,211 | B1 | 6/2020 | Yohannes et al. | |
| 11,451,101 | B2* | 9/2022 | Moasher | H02K 11/225 |
| 2001/0022243 | A1* | 9/2001 | Weimer | B60L 7/14 |
| | | | | 180/65.1 |
| 2007/0227470 | A1* | 10/2007 | Cole | H02K 11/048 |
| | | | | 123/3 |
| 2009/0302720 | A1* | 12/2009 | Chiba | H02K 7/1815 |
| | | | | 310/90 |
| 2010/0127508 | A1* | 5/2010 | Aschaber | H02K 7/006 |
| | | | | 290/1 R |
| 2019/0315221 | A1* | 10/2019 | Frait | B60K 6/405 |
| 2019/0351753 | A1* | 11/2019 | Lehmann | F16D 25/10 |
| 2020/0384846 | A1* | 12/2020 | Ramsey | B60K 17/02 |
| 2022/0001738 | A1* | 1/2022 | MacMillian | F16D 25/10 |
| 2022/0271587 | A1* | 8/2022 | Moasher | H02K 1/28 |

* cited by examiner

STARTER-GENERATOR WITH POWER ELECTRONIC UNIT

TECHNICAL FIELD

The present disclosure relates generally to a starter-generator, and more specifically to a starter-generator with a power electronics unit (PEU).

BACKGROUND

Starter-generators are known. One example is shown and described in U.S. Pat. No. 10,677,211 titled INTEGRATED STARTER-GENERATOR to Yohannes et al., hereby incorporated by reference as if set forth fully herein.

SUMMARY

Example aspects broadly comprise a starter-generator module for a vehicle including a bulkhead wall arranged for fixing to an engine block of an internal combustion engine, a module housing fixed to the bulkhead wall, an e-motor stator fixed to the module housing, an e-motor rotor disposed radially inside of the e-motor stator, and a power electronics unit fixed to the module housing. The module housing has a first opening and the power electronics unit covers the first opening. The e-motor rotor has a rotor carrier arranged for fixing to a crankshaft of the internal combustion engine. In an example embodiment, the rotor carrier includes a plurality of holes arranged for receiving respective fasteners for fixing the rotor carrier to a crankshaft of the engine, and a bolt circle diameter of the holes is less than an inside diameter of the first opening. In an example embodiment, the rotor carrier is fixed to a crankshaft of the engine by a bolt, and the first opening is arranged for receiving a tool to secure the bolt to the crankshaft.

In some example embodiments, the e-motor stator has a first plurality of AC electrical leads, and the power electronics unit comprises a second plurality of AC electrical leads, each one of the first plurality of AC electrical leads being removably connected to a one of the second plurality of AC electrical leads. In some example embodiments, the starter-generator module has a removable panel door attached to the module housing or the power electronics unit to enclose a chamber containing the first plurality of AC electrical leads and the second plurality of AC electrical leads. In some example embodiment, the power electronics unit comprises a second opening and the removable panel door is fixed to the power electronics unit and covers the second opening. In an example embodiment, the module housing has a third opening aligned with the second opening and the first plurality of AC electrical leads extends through the third opening.

In some example embodiments, the starter-generator module includes a resolver. The resolver has a resolver rotor fixed to the rotor carrier, and a resolver stator fixed to the module housing. The resolver stator has a first resolver electrical lead and the power electronics unit has a second resolver electrical lead removably connected to the first resolver electrical lead. In an example embodiment, the module housing has an annular wall with a radially extending tab, and the resolver stator is fixed to the radially extending tab. In an example embodiment, the bulkhead wall includes a fourth opening, the rotor carrier extends partially through the fourth opening, and the rotor carrier is sealed to the fourth opening by a dynamic dry seal.

Other example aspects broadly comprise a method of installing a starter-generator module on an internal combustion engine including: providing the starter-generator module including a bulkhead wall, a module housing fixed to the bulkhead wall and including a first opening, an e-motor stator fixed to the module housing, an e-motor rotor disposed radially inside of the e-motor stator, the e-motor rotor including a rotor carrier, and a shipping jig including a fifth opening, aligned with the first opening, doweled to the module housing and to the rotor carrier for positioning the e-motor rotor relative to the e-motor stator; fixing the bulkhead wall to an engine block of the internal combustion engine; fixing the rotor carrier to a crankshaft of the internal combustion engine by extending a first tool through the first opening and the fifth opening; removing the shipping jig; providing a power electronics unit; and installing the power electronics unit onto the module housing to cover the first opening. In an example embodiment, the bulkhead wall is sealed to the module housing. In an example embodiment, the rotor carrier is sealed to the bulkhead wall by a dynamic dry seal.

In some example embodiments, the e-motor stator has a first plurality of AC leads, the power electronics unit has a second plurality of AC leads, and the method includes fixing each one of the first plurality of AC leads to a one of the second plurality of AC leads. In some example embodiments, the power electronics unit includes a second opening and the step of fixing each one of the first plurality of AC leads to a one of the second plurality of AC leads includes extending a second tool through the second opening. In some example embodiments, the method includes installing a panel door to cover the second opening. In an example embodiment, the panel door is sealed to the power electronics unit.

In an example embodiment, the starter-generator module includes a resolver with a resolver rotor fixed to the rotor carrier and a resolver stator fixed to the module housing, the resolver stator comprising a first resolver electrical lead. The power electronics unit has a second resolver electrical lead and the step of installing the power electronics unit onto the module housing includes connecting the first resolver electrical lead to the second resolver electrical lead. In an example embodiment, the module housing is bolted to the bulkhead wall and sealed to the bulkhead wall by a first gasket, and the power electronics unit is installed onto the module housing using bolts and sealed to the module housing by a second gasket. In an example embodiment, the power electronics unit has an electrical connector, and the method includes connecting an electrical cable to the electrical connector.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
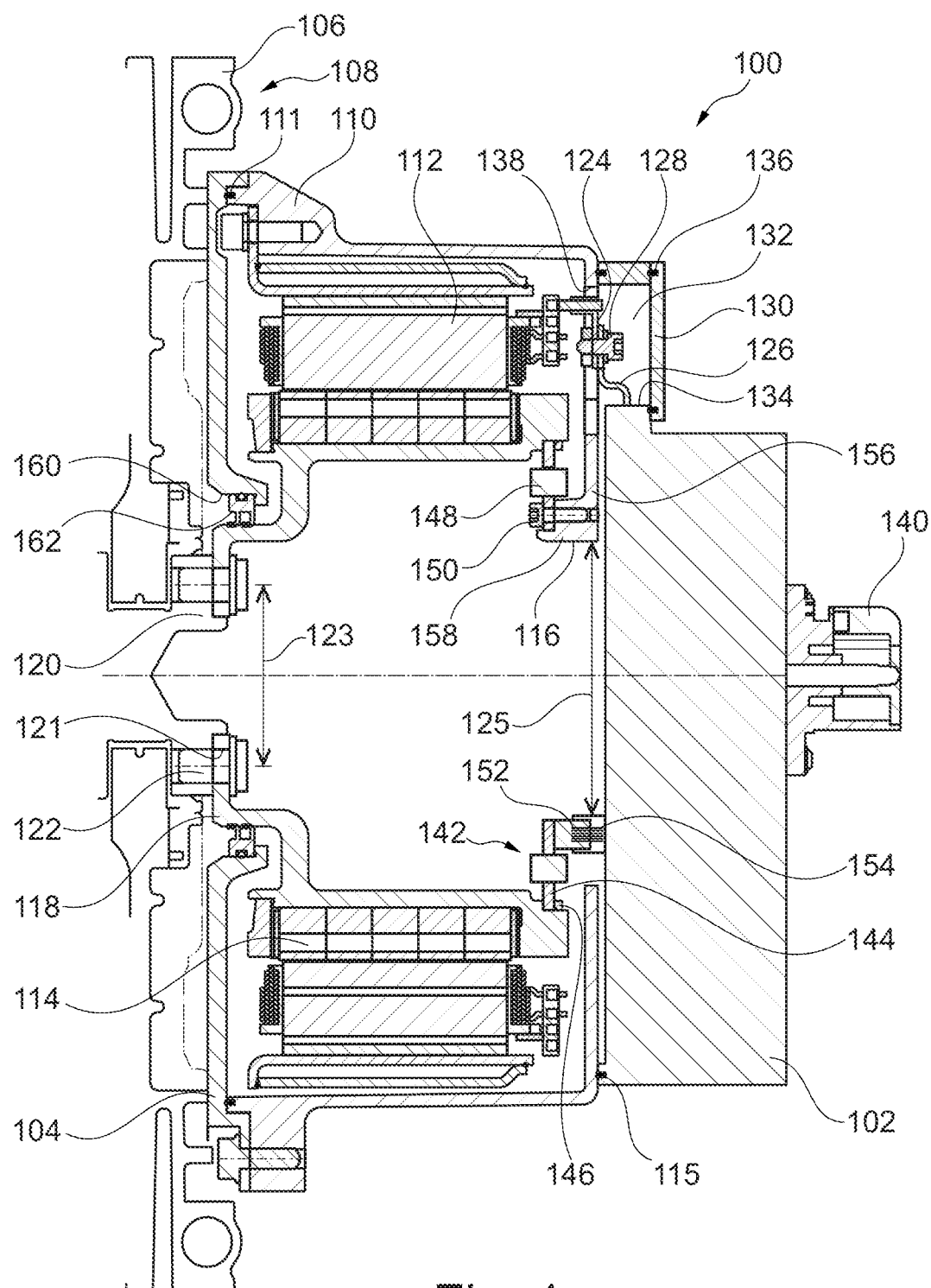
FIG. 1 illustrates a cross-sectional view of a starter-generator module with a power electronics unit according to an example embodiment.

The following description is made with reference to FIG. 1. FIG. 1 illustrates a cross-sectional view of starter-generator module 100 with power electronics unit 102 according to an example embodiment. Starter-generator module 100 includes bulkhead wall 104 fixed to engine block 106 of internal combustion engine 108 (partially shown), module housing 110 fixed to the bulkhead wall and sealed to the bulkhead wall by seal 111, for example, e-motor stator 112 fixed to the module housing, e-motor rotor 114 disposed radially inside of the e-motor stator, and power electronics unit 102 attached to the module housing and sealed to the module housing by seal 115, for example. The module housing includes opening 116. The e-motor includes rotor carrier 118 fixed to crankshaft 120 of the internal combustion engine. The power electronics unit covers opening 116.

Rotor carrier 118 includes holes 121 arranged for receiving respective fasteners 122 for fixing the rotor carrier to crankshaft 120 of engine 108. Bolt circle diameter 123 of the holes is less than inside diameter 125 of opening 116. The rotor carrier is fixed to the crankshaft of the engine by bolt 122 and opening 116 is arranged for receiving a tool (not shown) to secure the bolt to the crankshaft. In other words, the rotor carrier is fixed to the crankshaft with fastener 122 installed through opening 116. So, during installation of module 100 onto engine 108, fastener must pass through opening 116 before fixing to the crankshaft, as described in more detail below. Fastener 122 may be a bolt, for example. In the example shown, rotor carrier 118 is fixed to crankshaft 120 by a plurality of bolts.

E-motor stator 112 includes AC electrical leads 124 and power electronics unit 102 includes AC electrical leads 126. Each one of AC electrical leads 124 is removably connected to a one AC electrical leads 126. Leads 124 and 126 may be connected by bolts 128, for example. Module 100 includes removable panel door 130 attached to the power electronics unit to enclose chamber 132 containing AC electrical leads 124 and 126. Door 130 may be attached by bolts (not shown), for example. Although door 130 is shown attached to the power electronics unit, other embodiments (not shown) may include the removable panel door attached to the module housing. Power electronics unit 102 includes opening 134 and the removable panel door is sealed to the power electronics unit by seal 136 and covers opening 134. Module housing 110 includes opening 138 aligned with opening 134 and AC electrical leads 124 extend through opening 138.

Power electronics unit 102 includes electrical connector 140 arranged for connecting to an electrical cable of the vehicle (not shown). The starter generator module also includes resolver 142 with resolver rotor 144 fixed to the rotor carrier by ring 146, for example, and resolver stator 148 fixed to the module housing by bolt 150, for example. The resolver stator includes resolver electrical lead 152 and power electronics unit 102 includes resolver electrical lead 154 removably connected to resolver electrical lead 152. By removably connected, we mean that the two leads are not permanently connected and can be disconnected if necessary (e.g., to remove the PEU from the module housing. Module housing 110 includes annular wall 156 with radially extending tab 158 and the resolver stator is fixed to the radially extending tab.

Bulkhead wall 104 includes opening 160 and the rotor carrier extends partially through opening 160. Rotor carrier 118 is sealed to opening 160 by dynamic dry seal 162.

Figure 2:
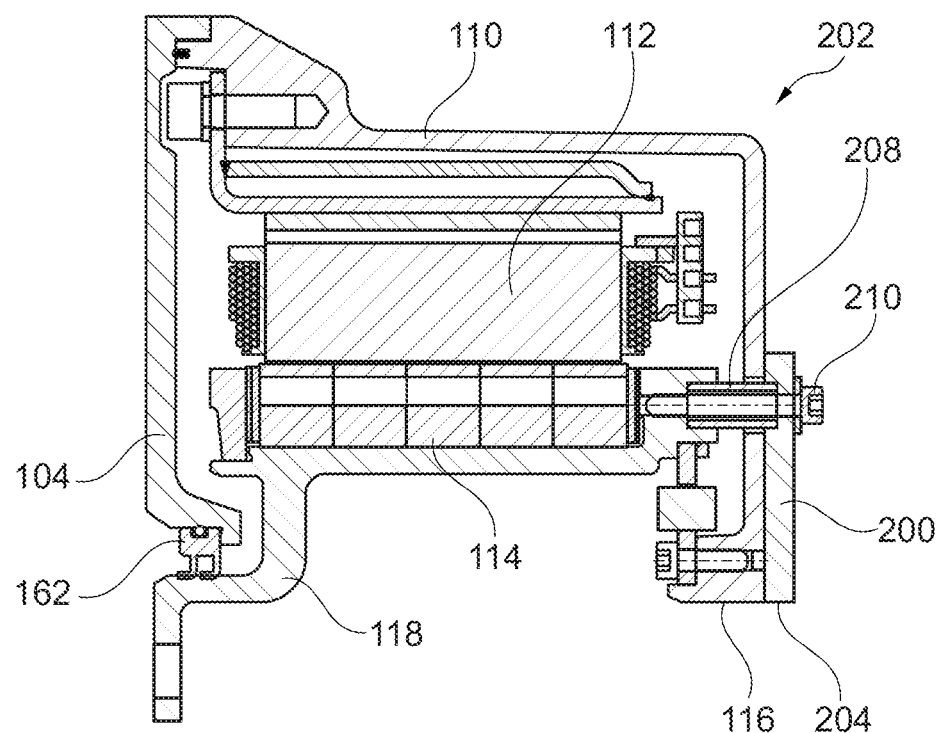
FIG. 2 illustrates a cross-sectional view of the starter-generator module of FIG. 1 with the power electronics unit replaced by a shipping jig.
Figure 2:
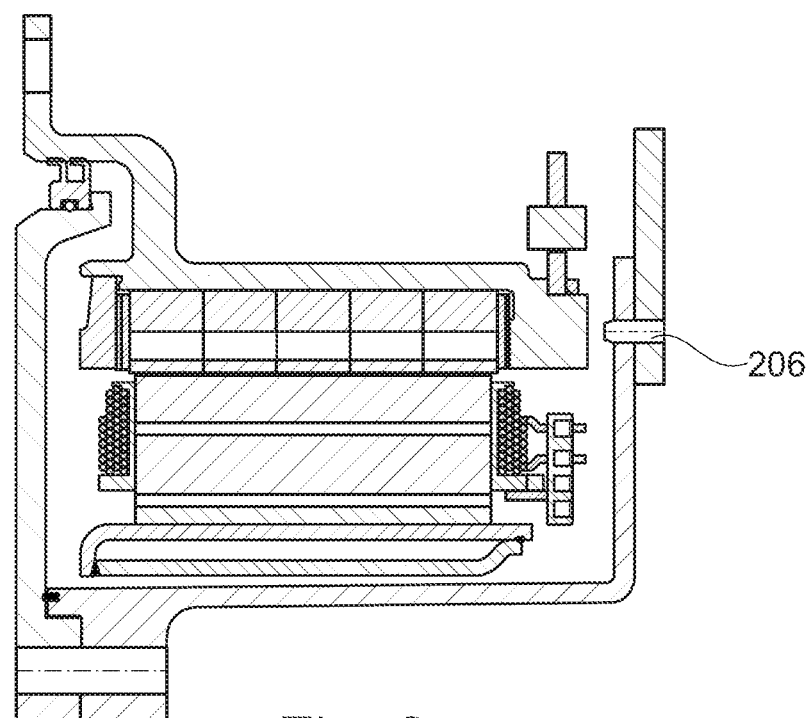

The following explanation is made with reference to FIGS. 1-2. FIG. 2 illustrates a cross-sectional view of the starter-generator module of FIG. 1 with the power electronics unit replaced by shipping jig 200. The following method may be used to install the starter-generator module on an internal combustion engine. The method includes providing starter-generator module 202 with bulkhead wall 104, module housing 110 fixed to the bulkhead wall and including opening 116, e-motor stator 112 fixed to the module housing, e-motor rotor 114 disposed radially inside of the e-motor stator and including rotor carrier 118, and shipping jig 200 including opening 204 aligned with opening 116. The shipping jig is doweled to the module housing by dowels 206, and doweled and fixed to rotor carrier 118 by hollow dowels 208 and bolts 210, respectively, for positioning the e-motor rotor relative to the e-motor stator.

The method further includes fixing the bulkhead wall to engine block 106 of internal combustion engine 108 by bolts (not shown), for example, and fixing the rotor carrier to crankshaft 120 of the internal combustion engine by extending a first tool (not shown) through openings 116 and 204 to tighten bolts 122, for example. The method also includes removing shipping jig 200 by unbolting bolts 210, for example, providing power electronics unit 102, and installing the power electronics unit onto the module housing to cover opening 116. Bulkhead wall 104 is sealed to the module housing by seal 111, for example, and the rotor carrier is sealed to the bulkhead wall by dynamic dry seal 162, for example.

The e-motor stator includes AC leads 124, the power electronics unit includes AC leads 126, and the method includes fixing each one of AC leads 124 to a one of AC leads 126. The power electronics unit includes opening 134 and the step of fixing each one of AC leads 124 to a one of AC leads 126 includes extending a second tool (not shown) through opening 134 to tighten bolts 128, for example. The method also includes installing panel door 130 to cover opening 134 wherein the panel door is sealed to the power electronics module by seal 136, for example.

The starter-generator module includes resolver 142 with resolver rotor 144 fixed to the rotor carrier and resolver stator 148 fixed to the module housing. The resolver stator includes resolver electrical lead 152, the power electronics unit includes resolver electrical lead 154, and the step of installing the power electronics unit onto the module housing also includes connecting the resolver electrical lead 152 to resolver electrical lead 154.

The module housing is bolted to the bulkhead wall by bolts (not shown) and sealed to the bulkhead wall by gasket 111, and the power electronics unit is installed onto the module housing using bolts (not shown) and sealed to the module housing by gasket 115. Power electronics unit 102 includes electrical connector 140 and the method includes connecting an electrical cable to the electrical connector.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Starter-generator module (with PEU)
102 Power electronics unit
104 Bulkhead wall
106 Engine block
108 Internal combustion engine
110 Module housing
111 Seal/gasket (module housing to bulkhead wall)
112 E-motor stator
114 E-motor rotor
115 Seal/gasket (PEU to module housing)
116 Opening (first, module housing)
118 Rotor carrier
120 Crankshaft
121 Holes (rotor carrier)
122 Fastener/bolt (carrier to crankshaft)
123 Bolt circle diameter (carrier holes)
124 AC electrical leads (first, stator)
125 Inside diameter (first opening)
126 AC electrical leads (second, PEU)
128 Bolts (AC electrical leads)
130 Removable panel door
132 Chamber (AC electrical leads)
134 Opening (second, PEU)
136 Seal (panel door to PEU)
138 Opening (third, module housing)
140 Electrical connector
142 Resolver
144 Resolver rotor
146 Ring (resolver rotor to rotor carrier)
148 Resolver stator
150 Bolt (resolver stator to module housing)
152 Resolver electrical lead (first, resolver stator)
154 Resolver electrical lead (second, PEU)
156 Annular wall (module housing)
158 Radially extending tab (annular wall)
160 Opening (fourth, bulkhead wall)
162 Dynamic dry seal
200 Shipping jig
202 Starter-generator module (with shipping jig)
204 Opening (fifth, shipping jig)
206 Dowel (shipping jig to module housing)
208 Hollow dowel (shipping jig to rotor carrier)
210 Bolts (shipping jig to rotor carrier)

What is claimed is:

1. A starter-generator module for a vehicle, comprising:
a bulkhead wall arranged for fixing to an engine block of an internal combustion engine;
a module housing fixed to the bulkhead wall and comprising a first opening;
an e-motor stator fixed to the module housing;
an e-motor rotor disposed radially inside of the e-motor stator, comprising:
a rotor carrier arranged for fixing to a crankshaft of the internal combustion engine; and
a power electronics unit:
disposed outside of the module housing;
attached to the module housing; and
covering the first opening.

2. The starter-generator module of claim 1 wherein:
the rotor carrier comprises a plurality of holes arranged for receiving respective fasteners for fixing the rotor carrier to a crankshaft of the engine; and
a bolt circle diameter of the holes is less than an inside diameter of the first opening.

3. The starter-generator module of claim 1 wherein:
the rotor carrier is fixed to a crankshaft of the engine by a bolt; and
the first opening is arranged for receiving a tool to secure the bolt to the crankshaft.

4. The starter-generator module of claim 1 wherein:
the e-motor stator comprises a first plurality of AC electrical leads; and
the power electronics unit comprises a second plurality of AC electrical leads, each one of the first plurality of AC electrical leads being removably connected to a one of the second plurality of AC electrical leads.

5. The starter-generator module of claim 4 further comprising a removable panel door attached to the module housing or the power electronics unit to enclose a chamber containing the first plurality of AC electrical leads and the second plurality of AC electrical leads.

6. The starter-generator module of claim 5 wherein the power electronics unit comprises a second opening and the removable panel door is attached to the power electronics unit and covers the second opening.

7. The starter-generator module of claim 6 wherein the module housing comprises a third opening aligned with the second opening and the first plurality of AC electrical leads extends through the third opening.

8. The starter-generator module of claim 1 further comprising a resolver, wherein:

the resolver comprises:
 a resolver rotor fixed to the rotor carrier; and
 a resolver stator fixed to the module housing, the resolver stator comprising a first resolver electrical lead; and
the power electronics unit comprises a second resolver electrical lead removably connected to the first resolver electrical lead.

9. The starter-generator module of claim 8 wherein the module housing comprises an annular wall with a radially extending tab, and the resolver stator is fixed to the radially extending tab.

10. The starter-generator module of claim 1 wherein:
the bulkhead wall comprises a fourth opening;
the rotor carrier extends partially through the fourth opening; and
the rotor carrier is sealed to the fourth opening by a dynamic dry seal.

11. A method of installing a starter-generator module on an internal combustion engine, comprising:
 providing the starter-generator module comprising:
  a bulkhead wall;
  a module housing fixed to the bulkhead wall and comprising a first opening;
  an e-motor stator fixed to the module housing;
  an e-motor rotor disposed radially inside of the e-motor stator, the e-motor rotor comprising a rotor carrier; and
  a shipping jig including a fifth opening, aligned with the first opening, doweled to the module housing and to the rotor carrier for positioning the e-motor rotor relative to the e-motor stator;
 fixing the bulkhead wall to an engine block of the internal combustion engine;
 fixing the rotor carrier to a crankshaft of the internal combustion engine by extending a first tool through the first opening and the fifth opening;
 removing the shipping jig;
 providing a power electronics unit; and
 installing the power electronics unit onto the module housing to cover the first opening.

12. The method of claim 11 wherein the bulkhead wall is sealed to the module housing.

13. The method of claim 11 wherein the rotor carrier is sealed to the bulkhead wall by a dynamic dry seal.

14. The method of claim 11 wherein:
the e-motor stator comprises a first plurality of AC leads;
the power electronics unit comprises a second plurality of AC leads; and
the method further comprises fixing each one of the first plurality of AC leads to a one of the second plurality of AC leads.

15. The method of claim 14 wherein the power electronics unit comprises a second opening and the step of fixing each one of the first plurality of AC leads to a one of the second plurality of AC leads comprises extending a second tool through the second opening.

16. The method of claim 15 further comprising installing a panel door to cover the second opening.

17. The method of claim 16 wherein the panel door is sealed to the power electronics unit.

18. The method of claim 11 wherein:
the starter-generator module further comprises a resolver comprising:
 a resolver rotor fixed to the rotor carrier; and
 a resolver stator fixed to the module housing, the resolver stator comprising a first resolver electrical lead;
the power electronics unit comprises a second resolver electrical lead; and
the step of installing the power electronics unit onto the module housing further comprises connecting the first resolver electrical lead to the second resolver electrical lead.

19. The method of claim 11 wherein:
the module housing is bolted to the bulkhead wall and sealed to the bulkhead wall by a first gasket; and
the power electronics unit is installed onto the module housing using bolts and sealed to the module housing by a second gasket.

20. The method of claim 11 wherein the power electronics unit comprises an electrical connector, the method further comprising connecting an electrical cable to the electrical connector.

* * * * *